United States Patent
Ozkan

(10) Patent No.: US 12,452,123 B2
(45) Date of Patent: Oct. 21, 2025

(54) INTEGRATING RADIO NETWORK AND CORE NETWORK FAILURE ANALYSES USING CROSS-DOMAIN MATRICES

(71) Applicant: T-Mobile USA, Inc., Bellevue, WA (US)

(72) Inventor: Eray Ozkan, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 169 days.

(21) Appl. No.: 18/503,020

(22) Filed: Nov. 6, 2023

(65) Prior Publication Data
US 2025/0150329 A1    May 8, 2025

(51) Int. Cl.
G06F 15/16     (2006.01)
G06F 11/07     (2006.01)
G06F 16/28     (2019.01)
H04L 41/0631   (2022.01)

(52) U.S. Cl.
CPC ........ *H04L 41/065* (2013.01); *G06F 11/0709* (2013.01); *G06F 11/079* (2013.01); *G06F 16/285* (2019.01)

(58) Field of Classification Search
CPC .............. H04L 41/065; H04L 41/0631; H04L 41/0677; H04L 41/069; G06F 11/0709; G06F 11/079; G06F 16/285
See application file for complete search history.

(56) References Cited

U.S. PATENT DOCUMENTS

| | | | |
|---|---|---|---|
| 7,526,550 B2 | 4/2009 | Frey et al. |
| 7,721,266 B2 | 5/2010 | Frey et al. |
| 8,238,267 B2 | 8/2012 | Dwyer et al. |
| 8,699,323 B2 | 4/2014 | Zhao et al. |
| 8,817,600 B2 | 8/2014 | Payyappilly et al. |
| 8,934,336 B2 | 1/2015 | Ramachandran et al. |
| 9,055,154 B2 | 6/2015 | Griffin et al. |
| 9,277,431 B1 | 3/2016 | Podolsky |
| 9,468,035 B2 | 10/2016 | Vargantwar et al. |
| 9,794,809 B2 | 10/2017 | Chou et al. |
| 10,165,457 B2 | 12/2018 | Fernandez Arboleda et al. |
| 10,455,438 B2 | 10/2019 | Bisada |
| 10,772,016 B2 | 9/2020 | Chen et al. |
| 10,812,534 B2 | 10/2020 | Chong et al. |

(Continued)

FOREIGN PATENT DOCUMENTS

| | | |
|---|---|---|
| CN | 102668687 A | 9/2012 |
| CN | 105744554 A | 7/2016 |

(Continued)

*Primary Examiner* — Razu A Miah
(74) *Attorney, Agent, or Firm* — Perkins Coie LLP

(57) ABSTRACT

The technology includes a system to integrate core and radio network failure analyses using cross-domain matrices. The system pulls core network trace logs from a core network and radio network trace logs from a radio network. The system creates a cross-domain trace log of failed sessions by matching the radio network trace logs with the core network trace logs. The system determines cross-domain matrices by assigning coordinates to the failure categories based on average user device signal strengths and average user device interference levels. The system generates plots of the cross-domain matrices and analysis recommendations for display to a user based on the cross-domain matrices.

20 Claims, 7 Drawing Sheets

(56) References Cited

U.S. PATENT DOCUMENTS

| | | | |
|---|---|---|---|
| 10,917,819 B2 | 2/2021 | Shetty et al. | |
| 11,178,274 B2 | 11/2021 | Donnenwirth et al. | |
| 11,206,589 B2 | 12/2021 | Chen et al. | |
| 11,219,080 B2 | 1/2022 | Liu et al. | |
| 11,265,786 B2 | 3/2022 | Froehlich et al. | |
| 11,271,831 B2 | 3/2022 | Patil et al. | |
| 11,445,560 B2 | 9/2022 | Keller et al. | |
| 11,483,882 B2 | 10/2022 | Patil et al. | |
| 11,546,243 B1 | 1/2023 | Menon et al. | |
| 11,770,323 B2 | 9/2023 | Menon et al. | |
| 2007/0133519 A1* | 6/2007 | Florkey | H04W 76/15 370/352 |
| 2009/0312001 A1 | 12/2009 | Bodog | |
| 2012/0320733 A1 | 12/2012 | Zhao et al. | |
| 2013/0114402 A1* | 5/2013 | Ould-Brahim | H04L 43/0811 370/242 |
| 2014/0153482 A1* | 6/2014 | Schmidt | H04L 1/1854 370/328 |
| 2016/0241429 A1 | 8/2016 | Froehlich | |
| 2022/0124560 A1 | 4/2022 | Yeh et al. | |
| 2022/0353713 A1 | 11/2022 | Kollar et al. | |
| 2023/0014126 A1 | 1/2023 | Patil et al. | |
| 2023/0040079 A1 | 2/2023 | Qu et al. | |
| 2023/0319904 A1 | 10/2023 | Hua et al. | |

FOREIGN PATENT DOCUMENTS

| | | |
|---|---|---|
| CN | 109996284 A | 7/2019 |
| CN | 107635289 B | 6/2020 |
| DE | 112010004619 B4 | 9/2020 |
| EP | 3072326 B1 | 8/2019 |
| EP | 3646546 B1 | 10/2022 |
| JP | 5509345 B2 | 3/2014 |
| KR | 100591543 B1 | 6/2006 |
| KR | 100903507 B1 | 6/2009 |
| KR | 20130136539 A | 12/2013 |
| KR | 20140080550 A | 6/2014 |
| KR | 101415818 B1 | 7/2014 |
| KR | 20150129047 A | 11/2015 |
| WO | 2010003750 A2 | 1/2010 |
| WO | 2011084753 A1 | 7/2011 |
| WO | 2014023817 A1 | 2/2014 |
| WO | 2014072407 A1 | 5/2014 |
| WO | 2015005962 A1 | 1/2015 |
| WO | 2015075501 A1 | 5/2015 |
| WO | 2016090841 A1 | 6/2016 |
| WO | 2017025773 A1 | 2/2017 |
| WO | 2017037598 A1 | 3/2017 |
| WO | 2018202122 A1 | 11/2018 |
| WO | 2019001749 A1 | 1/2019 |

\* cited by examiner

INTEGRATING RADIO NETWORK AND CORE NETWORK FAILURE ANALYSES USING CROSS-DOMAIN MATRICES

BACKGROUND

A radio network is part of a mobile telecommunication system implementing a radio access technology. Conceptually, it resides between a device such as a mobile phone, a computer, or any remotely controlled machine and provides connection with its core network. Depending on the standard, mobile phones and other wireless connected devices are known as user equipment (UE).

A core network is a part of a computer network that interconnects networks, providing a path for the exchange of information between different subnetworks. A core network can tie together diverse networks in the same building, in different buildings in a campus environment, or over wide areas. Normally, the core network's capacity is greater than the networks connected to it.

A telecommunications network is a group of nodes interconnected by telecommunications links that are used to exchange messages between the nodes. The links may use a variety of technologies based on the methodologies of circuit switching, message switching, or packet switching to pass messages and signals. Multiple nodes may cooperate to pass the message from an originating node to the destination node via multiple network hops. For this routing function, each node in the network is assigned a network address for identification and location on the network. The collection of addresses in the network is called the address space of the network. Examples of telecommunications networks include computer networks, the Internet, the public switched telephone network (PSTN), the global telex network, and the wireless radio networks of cell phone telecommunication providers.

BRIEF DESCRIPTION OF THE DRAWINGS

Detailed descriptions of implementations of the present invention will be described and explained through the use of the accompanying drawings.

Figure 1:
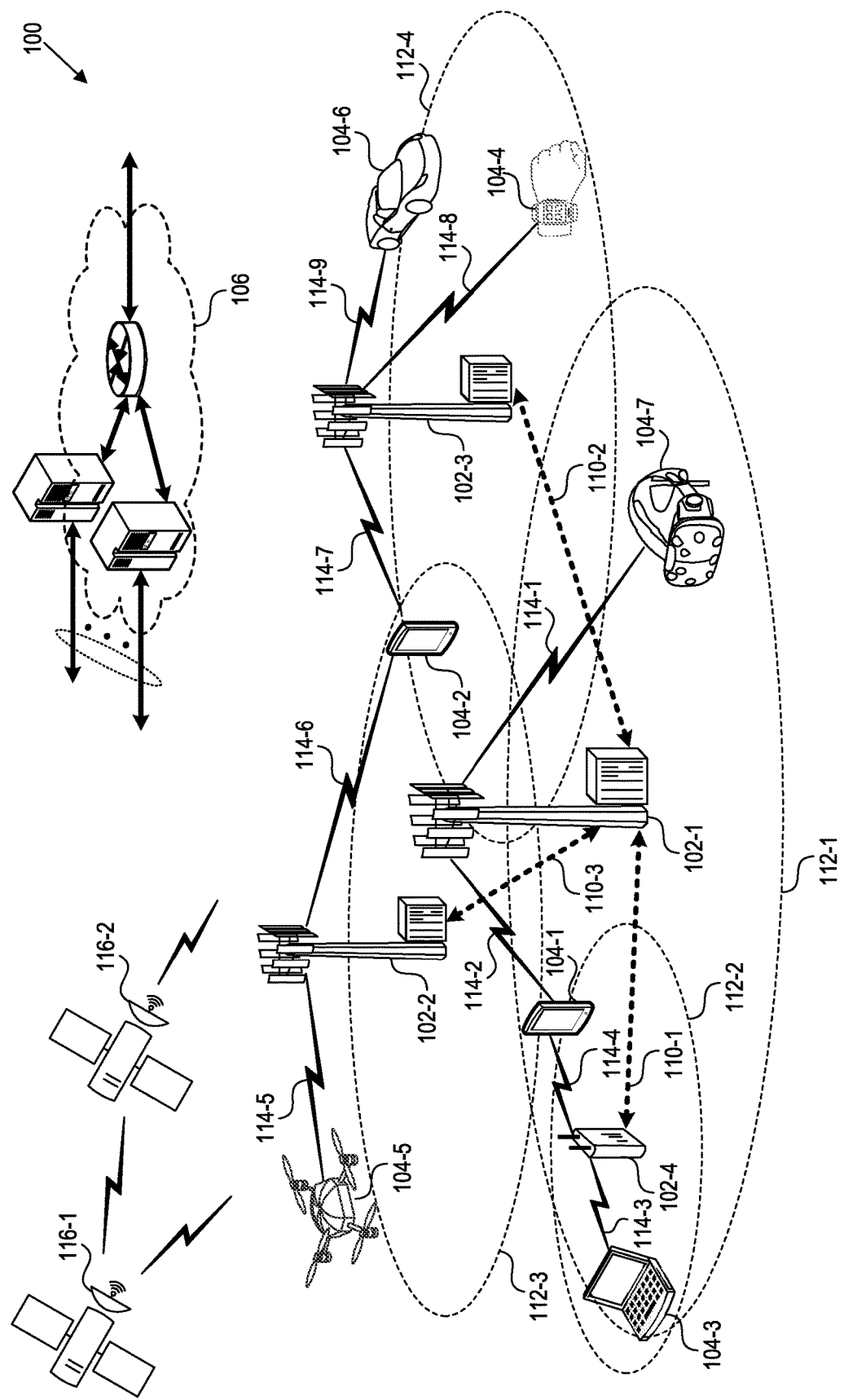
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to integrating radio network and core network failure analyses. The technology provides cross-domain matrices, in combination with weighted plots and integrated trace logs comprising failed session data (e.g., failed calls and/or interrupted data packet streams), to accomplish this solution. The integrated trace logs can be sliced (e.g., divided and grouped) according to location (e.g., site, node, cell, tracking area code (TAC), region, Radio Access Network (RAN) vendor, or device Original Equipment Manufacturer (OEM) vendor), frequency layers, and failure types, among other categories. The radio network and the core network form separate, yet interconnected, parts of a telecommunications network. Both the core network and the radio network generate trace logs recording subscriber sessions (e.g., phone calls or data packet streams) supported by the telecommunications network. Within these trace logs are the recorded data for failed sessions (e.g., failed call sessions or interrupted data packet streams). Viewed separately, the core network trace logs and radio network trace logs provide an incomplete view of a single failed session. This makes it difficult for a user who is interested in analyzing such logs for potential root causes or remedies—one, or both, of the networks may be affected by or involved in the failure. By combining information from the radio network and the core network, and using the cross-domain matrix to filter and arrange that combined information, these two separate areas of expertise (the radio network and the core network) are simplified and distilled to enable a single user—who may possess a background in only one (or neither) field—to make determinations regarding a root cause of a failed session.

In some instances, the user may be a radio frequency (RF) engineer or a network engineer. These are two very different skill sets. An RF engineer deals with coverage, signal quality, interference, channel planning, tower and antenna design, power system design, transmission line design, and the maintenance of all of the foregoing. A network engineer deals with data flow, including Internet Protocol (IP) schemes, ethernet switching, routing parameters and protocols, and any other issue that involves the traffic flow from end user to end user across the core network. Both fields are so specialized that it is difficult for a single individual to develop an expertise and understanding of both, at least to the extent that is required to gain a complete understanding of a failed call session, for example.

Embodiments of the disclosed technology provide a solution to the foregoing problem of siloed expertise by providing a shorthand rubric, or heuristic, for diagnosing and analyzing network failures. This can be done by integrating the information from radio networks with core networks to generate cross-domain matrices. Other problems overcome by embodiments of the disclosed technology include streamlining the scraping and assembling of such data from its disparate sources, which can occupy more time for network and RF engineers than the application of their domain expertise toward performing actual analysis. This inefficiency is compounded by the difficulties presented in the network data, some 40%-50% of which is lacking the requisite features to identify where the failures originated. By pulling this data, aggregating it, slicing it, and then presenting it in a fashion that makes it accessible for analysis, embodiments of this technology overcome the difficulties faced by previous solutions that were time-consuming, cumbersome, or opaque.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless communications system, e.g., a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, IP connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5;

vehicles with wireless connectivity 104-6; head-mounted displays with wireless augmented reality/virtual reality (AR/VR) connectivity 104-7; portable gaming consoles; wireless routers, gateways, modems, and other fixed wireless access devices; wirelessly connected sensors that provide data to a remote server over a network; IoT devices such as wirelessly connected smart home appliances; etc.

A wireless device (e.g., wireless devices 104) can be referred to as a UE, a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions while the UL transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different subcarrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged RAN and core architecture to achieve Control and User Plane Separation (CUPS) and achieve extremely low user plane latency. In yet another example of 6G, the network 100 can implement a converged Wi-Fi and core architecture to increase and improve indoor coverage.

Integrated Network Failure Analysis Using Cross-Domain Matrices

Figure 2:
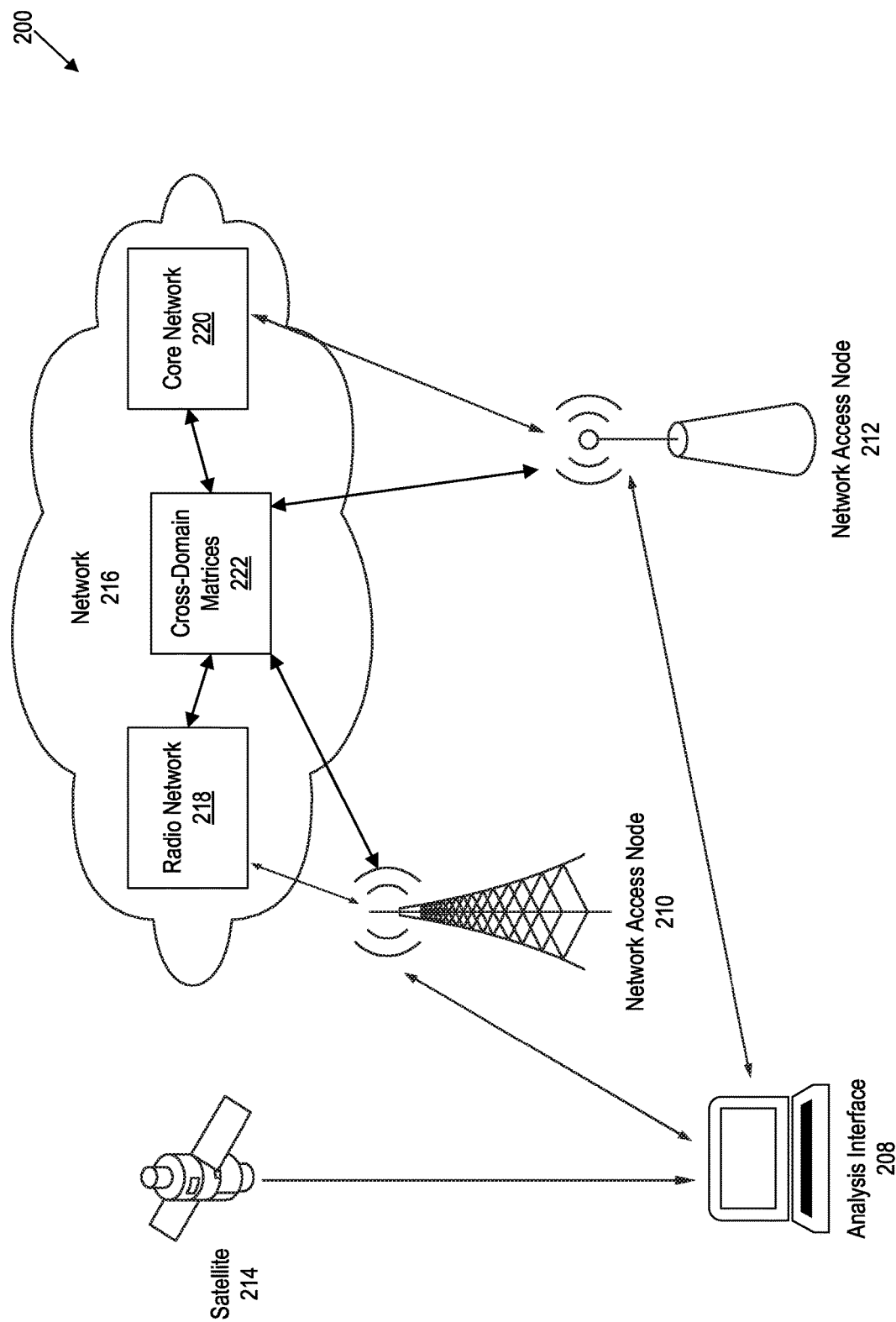
FIG. 2 is a block diagram that illustrates a system for integrating radio network and core network failure analyses using cross-domain matrices.

FIG. 2 is a block diagram that illustrates a system 200 for integrating radio network 218 and core network 220 failure analyses using cross-domain matrices 222. Both the core network 220 and the radio network 218 generate trace logs recording subscriber sessions (e.g., phone calls or data packet streams) supported by the telecommunications network 216. Such trace logs can be combined remotely to eventually form cross-domain matrices 222, as illustrated, or they can be communicated via network nodes in order to reach an analysis interface 208 where they can be combined locally. The network nodes include the network access nodes 210 and 212 as well as the satellite 214.

Examples of the NANs can include a macro cell, a small cell, a micro cell, a femto cell, or a pico cell. The NAN can include multiple NANs of varied type and service area. The network access nodes 210 and 212 are separate and distinct from the analysis interface 208.

Within these trace logs are the recorded data for failed sessions (e.g., failed call sessions or interrupted data packet streams). In one example, the core network trace logs include Customer SIP (Session Initiation Protocol) drop data, detailed packet capture data (e.g., PCAP logs), core network signaling data between core network elements and the radio network 218, failure types (e.g., Next-Generation Application Protocol (NGAP) Release Cause from gNB), subscriber IDs (e.g., an International Mobile Subscriber Identity (IMSI) numbers), and failure timestamps. The core network elements and the radio network 218 can include the network access nodes 210 and 212 as well as the satellite 214.

The radio network trace logs can include user device signal strengths (e.g., 5G and LTE Reference Signal Received Power (RSRP)/Reference Signal Received Quality (RSRQ), as measured in decibel milliwatts (dBm)), user device interference levels (e.g., 5G and LTE SINR (signal-to-noise ratio)), release cause codes ((NGAP) Release Cause from gNB), subscriber IDs, failure timestamps, call termination frequency layers, and call termination cells.

The system 200 creates cross-domain trace logs of the failed call sessions. The system 200 accomplishes this in part by pulling core network trace logs from databases (Splunk, Hive, etc.) connected to the core network 220 to retrieve core network data for a first time interval (e.g., the past seven days or a length of time substantial enough to overcome noisy or random fluctuations in the data) as well as pulling radio network trace logs for the same failed call sessions from the radio network 218 in the same first time interval. The system 200 creates a cross-domain trace log of the failed call sessions for the first time interval by matching the radio network trace logs with the core network trace logs. This matching can be done using the subscriber IDs (e.g., IMSIs) and/or the failure timestamps that correspond between the core network trace logs and the radio network trace logs.

In some embodiments, the databases of the core network 220 are connected to an Multi Mediation (MM) system (e.g., a type of mediation platform to bridge all network elements with Operations Support System (OSS) and Business Support System (BSS)). In such embodiments, the system pulls the core network trace logs from the databases using a Telephony Application Server (TAS), which belongs to an IP Multimedia Subsystem (IMS) of the telecommunications network 216.

The system 200 slices the failed call sessions of the cross-domain trace log into location slices, frequency layer slices, and failure categories using the call termination cells, call termination frequency layers, and failure types from the cross-domain trace log. Such slices can be adaptive to user input. For example, a user can choose to divide the failed call sessions first according to location slice, and then according to frequency layer, and finally according to failure category, or they can choose to divide the failed call sessions in the reverse order, depending on if a user chooses to directly compare failure categories within markets or to compare markets relative to individual failure categories. Such differences in approaches to slicing will be better appreciated in later discussion regarding the cross-domain matrix and in later FIGS. 3-5.

The cross-domain matrices 222 can interchangeably be referred to as cross-domain matrices. The system 200 determines cross-domain matrices according to the slices chosen by the user (e.g., cross-domain matrices are determined for the frequency layer slices in the market slices). This can be accomplished in part by assigning coordinates to the failure categories in the cross-domain matrices based on average user device signal strengths and average user device interference levels. The average user device signal strengths and average user device interference levels can be determined using one of a number of statistical methods for calculating the center of a dataset (e.g., mean, median, or mode) as applied to the failure types from the failed call sessions in the cross-domain trace log.

Figure 3:
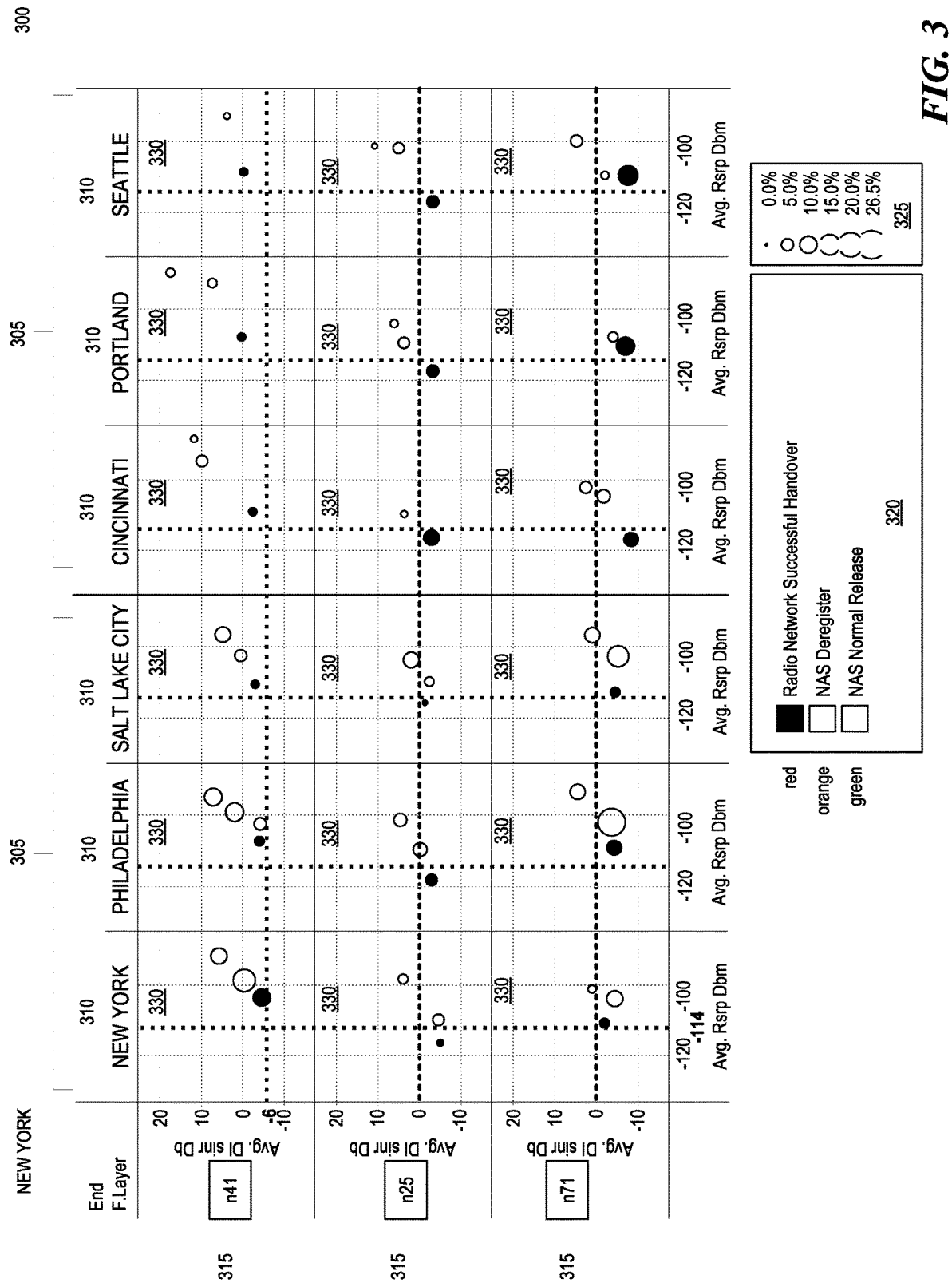
FIG. 3 illustrates an example display of cross-domain matrices generated for a user by a system.
Figure 4:
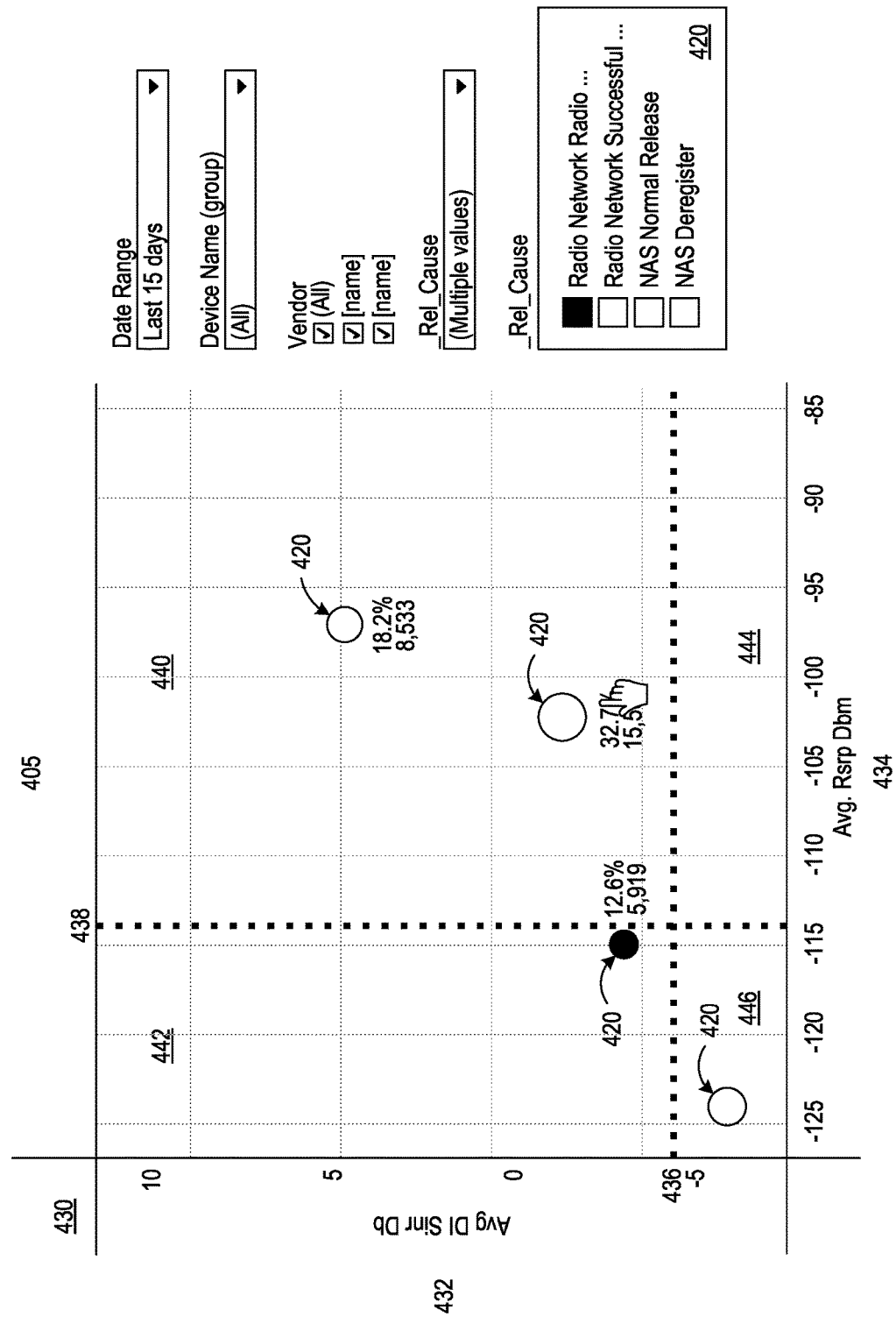
FIG. 4 illustrates an example detailed view of a cross-domain matrix generated for display to a user by a system.
Figure 5:
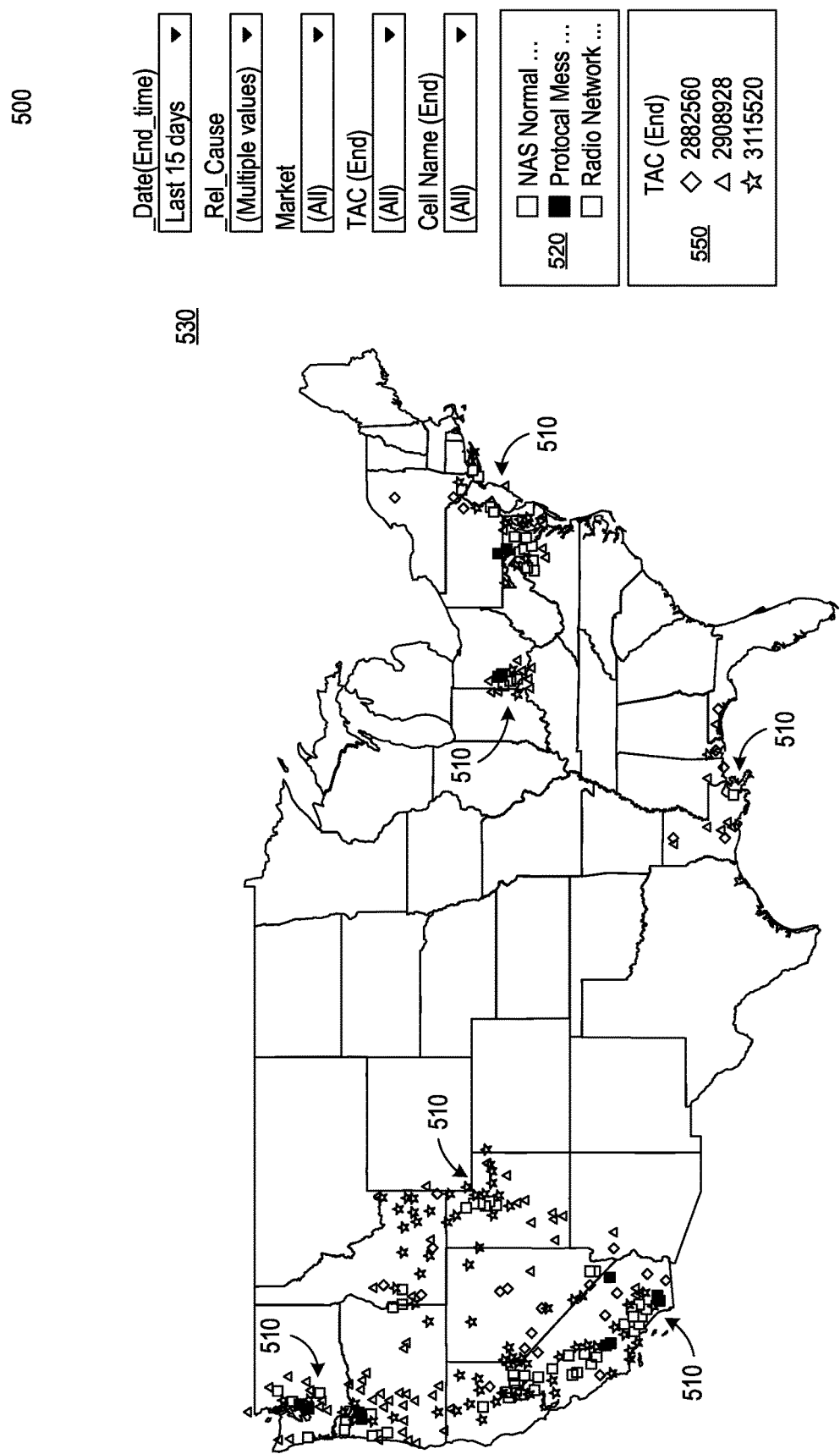
FIG. 5 illustrates an example geographical view of a cross-domain matrix generated for display to a user by a system.

The system 200 generates plots of the cross-domain matrices along with analysis recommendations for display. Example plots are illustrated in FIGS. 3-5. The analysis recommendations are based on the cross-domain matrices and include sorted lists of failure categories that require user investigation as well as most likely root causes for the failure categories. In some embodiments, the system 200 determines priority scores for failure categories based on the coordinates; the analysis recommendations include a sorted list of highest priority failures based on the priority scores.

The cross-domain matrices 222—along with the plots and analysis recommendations—can be generated remotely, as illustrated, or they can be generated locally on an analysis interface 208 belonging to a user (e.g., a radio engineer, a network engineer, or a telecommunications domain expert). The network access nodes 210 and 212 are thus configured to communicate trace log data, cross-domain matrices, plots, and analysis recommendations between the telecommunications network 216 and the analysis interface 208.

FIG. 3 illustrates an example display of cross-domain matrices 330 generated for a user by a system 300. In the example display, the system 300 has sliced the failed call sessions of the cross-domain trace log into location slices 310 (e.g., New York, Philadelphia, Salt Lake City, Cincinnati, Portland, and Seattle), which have been sliced into frequency layer slices 315 (e.g., n41, n25, and n71), and finally grouped according to failure categories 320. The system 300 assigns coordinates to the failure categories 320 on their respective cross-domain matrices 330 based on distinguishing radio network and core network data (e.g., average user device signal strengths and average user device interference levels). An example cross-domain matrix 330 will be described and illustrated in greater detail in FIG. 4. In some embodiments, the system 300 has grouped the location slices 310 according to vendors 305, as illustrated. The vendors 305 can include RAN vendors or device OEM vendors.

In some embodiments, the system 300 includes determining a total number of failed sessions for each location slice. In such embodiments, the system 300 determines weights 325 for a failure category. In the example display, the weights 325 correspond to the size of the failure categories on the cross-domain matrices 330. A failure category's weight 325 is based on the percentage of the total number of failed sessions that failure category 320 accounts for in a location slice 310. For example, a greater weight 325 is based on a greater percentage of failed sessions in the location slice 310. Additionally, generating the plots of the cross-domain matrices 330 can include arranging the failure categories 320 into sorted lists according to their weights 325. Such a design can expedite the analysis of a user tasked with an overwhelming number and variety of failures.

FIG. 4 illustrates an example detailed view of a cross-domain matrix 430 generated for display to a user by a system 400. In some embodiments, the system 400 determines the cross-domain matrix 430 by determining a threshold for each axis of the cross-domain matrix 430. For example, as illustrated, the thresholds can include an interference level threshold 436 and a signal strength threshold 438. The interference level threshold 436 can be based on a first user input (e.g., provided by a domain expert manually setting the desired cutoff between "good" and "bad" interference levels) or from an average interference level determined from historical cross-domain trace logs (e.g., a running mean, median, or mode recording the average interference level). The system 400 can determine the signal strength threshold 438 based on a second user input (e.g., provided by a domain expert manually setting the desired cutoff between "good" and "bad" signal strengths) or from an average signal strength determined from the historical cross-domain trace logs (e.g., a running mean, median, or mode recording the average signal strength).

The thresholds divide the cross-domain matrix 430 into regions. The regions form the basis for analysis recommendations. For example, the interference level threshold 436 and the signal strength threshold 438 divide the cross-domain matrix 430 into regions. The regions can include a first quadrant 440 including a first group of failed call sessions comprising good average signal strengths and good average interference levels, a second quadrant 442 including a second group of failed call sessions comprising bad average signal strengths and good average interference levels, a third quadrant 444 including a third group of failed call sessions comprising good average signal strengths and bad average interference levels, and a fourth quadrant 446 including a fourth group of failed call sessions comprising bad average signal strengths and bad average interference levels.

Continuing this example, the system 400 can determine a best-fit quadrant for each failure category on the cross-domain matrix 430 based on a comparison between the coordinates assigned to the failure category and the interference level threshold 436 and the signal strength threshold 438. Based on the best-fit quadrants, the system 400 can assign a most likely root cause to the failure categories. In one example, the system 400 selects the most likely root cause from a set of most likely root causes, including radio network error, core network error, and device error as potential most likely root causes.

In other examples, the system 400 can include a machine learning (ML) engine to assist with recognizing higher order patterns among the core network and radio network data to add further dimensionality and thresholds to the cross-domain matrix 430. The ML engine can be coupled to the cross-domain matrix 430 and be configured to generate data that can be used to predict the most likely root cause for a failed call session or an interrupted data packet stream. The ML engine includes a model that, as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, naïve Bayes mixture models, clustering models, reinforcement learning, probability distributions, decision trees, decision tree forests, and others. Models can be configured for various situations, data types, sources, and output formats.

In some implementations, a model can include a neural network with multiple input nodes that receive failed call session data from core networks and radio networks. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as a prediction regarding whether a mobile asset is due for maintenance. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

The model can be trained with supervised learning, where the training data includes the call session data from radio networks and core networks as input and a desired output, such as likelihoods of failure and potential root causes for such failures. A representation of an actual root cause for a failed call session can be provided to the model. Output from the model can be compared to the desired output for that type of failed call session and, based on the comparison, the model can be modified, such as by changing weights between nodes of the neural network or parameters of the functions used at each node in the neural network (e.g., applying a loss function). After applying each of the types of most likely root causes or potential remedies from the training data and modifying the model in this manner, the model can be trained to evaluate new types of most likely root causes or potential remedies.

FIG. 5 is an illustration of a geographical view of a cross-domain matrix 530 generated for display to a user by a system 500. In the geographical view, the system 500 generates geographical plots to display the location slices 510, organizing failed call sessions according to failure category 520 and device names 550 (e.g., TACs) in a geographical manner on the cross-domain matrix 530.

Figure 6:
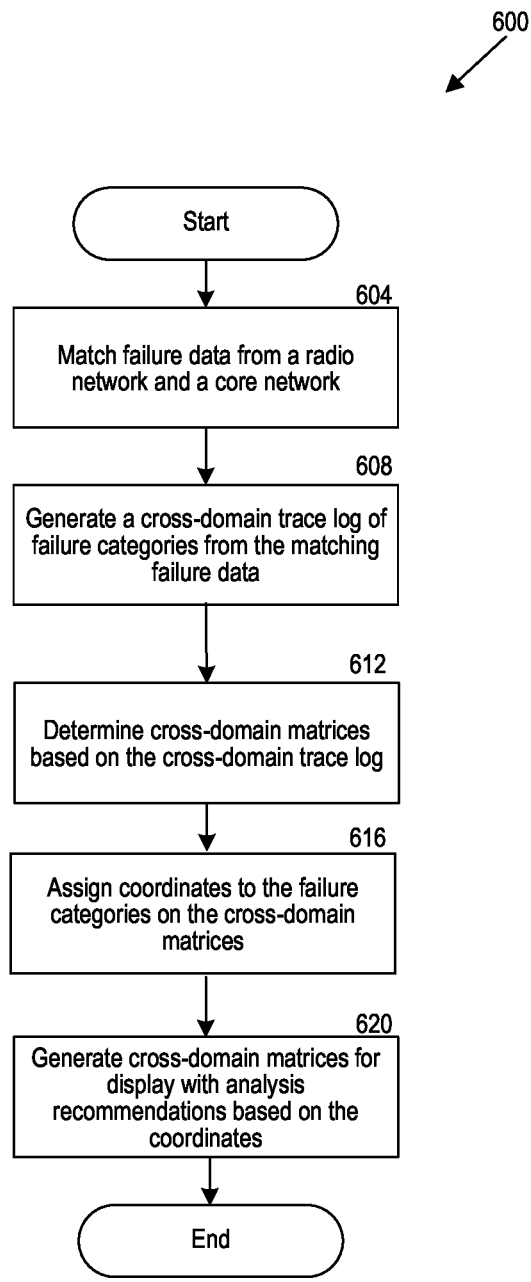
FIG. 6 is a flowchart that illustrates a method to integrate radio network and core network failure analyses using cross-domain matrices.

FIG. 6 is a flowchart that illustrates a method 600 to integrate radio network and core network failure analyses using cross-domain matrices. The method 600 includes matching failure data from a radio network and a core network for a first time window (step 604). The method 600 includes generating a cross-domain trace log of failure categories from the matching failure data (step 608). In some embodiments, the cross-domain trace log includes signal strengths, interference levels, markets, frequency layers, and failure categories.

The method 600 includes determining cross-domain matrices based on the cross-domain trace log (step 612). In some embodiments, the signal strengths and the interference levels are used from the cross-domain trace log to determine the cross-domain matrices. In some embodiments, determining the cross-domain matrices further includes determining a total number of failed sessions in each location slice. Additionally, the method 600 can include determining a weight for each failure category in each location slice. In one example, the weight is based on a percentage of the total number of failed sessions a failure category accounts for in a location slice (so that a greater weight is based on a greater percentage of the total number of failed sessions in a location slice).

The method 600 includes assigning coordinates to the failure categories on the cross-domain matrices (step 616). In some embodiments, assigning coordinates further includes determining thresholds for each axis in the cross-domain matrix, where the thresholds divide the cross-domain matrices into regions. In one example, the thresholds include interference level thresholds and signal strength thresholds. The thresholds can be based on a first user input, or they can be based on an average value determined from historical cross-domain trace logs (e.g., a mean interference level or signal strength for failed call sessions in a seven-day window). In an example cross-domain matrix with two axes, associated with average interference level and average signal strength of failed calls, the coordinates for the failure categories fall into one of four regions (e.g., quadrants): a first quadrant circumscribing failed call sessions with good average signal strengths and good average interference levels; a second quadrant circumscribing failed call sessions with bad average signal strengths and good average interference levels; a third quadrant circumscribing failed call sessions with good average signal strengths and bad average interference levels; and a fourth quadrant circumscribing failed call sessions with bad average signal strengths and bad average interference levels.

The method 600 includes generating the cross-domain matrices for display along with analysis recommendations based on the coordinates of the failure categories (step 620). In some embodiments, the analysis recommendations include high-priority failure categories and most likely root causes. For example, the most likely root causes can include a set of most likely root causes including radio network error, core network error, and device error. In embodiments where generating cross-domain matrices for display also includes determining regions (e.g., quadrants) for failure category coordinates—e.g., based on a comparison of the coordinates to thresholds—the analysis recommendations are based on the cross-domain matrix regions. For example, a tentative most likely root cause of "core network error" can be assigned to a failure category if its coordinates are within the first quadrant (where having a good signal strength and a good interference level would preclude a radio network error). In additional embodiments, generating the cross-domain matrices for display further includes generating plots. The plots can include geographical displays of markets in which the markets are grouped according to vendors, including device names and tracking area code (TAC). In some embodiments, the failed sessions are organized geographically on the plots and represented according to TAC and failure category.

Computer System

Figure 7:
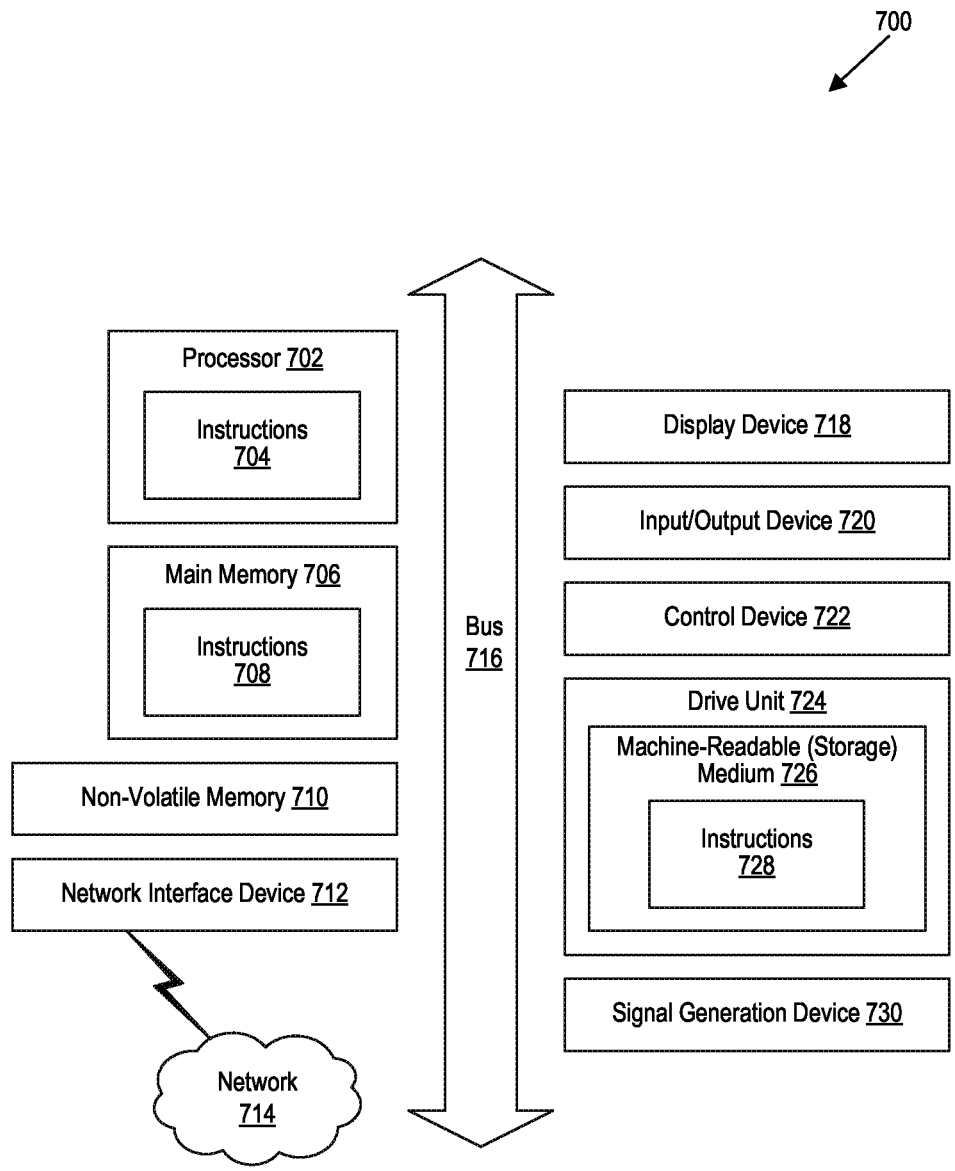
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 700. In some implementations, the computer system 700 can be an embedded computer system, a system-on-chip (SOC), a single-board computer (SBC) system, or a distributed system such as a mesh of computer systems, or it can include one or more cloud components in one or more networks. Where appropriate, one or more computer systems 700 can perform operations in real time, in near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions when executed by at least one data processor of a system cause the system to:
retrieve core network trace logs from databases connected to a core network of a telecommunications network, the core network trace logs comprising core network data for failed call sessions that occurred in a first time interval;
retrieve radio network trace logs from a radio network of the telecommunications network, the radio network trace logs comprising radio network data for the failed call sessions that occurred in the first time interval;
create a cross-domain trace log of the failed call sessions by matching the radio network trace logs with the core network trace logs using corresponding subscriber IDs and failure timestamps;
slice the failed call sessions into location slices, frequency layer slices, and failure categories using call termination cells, call termination frequency layers, and failure types from the cross-domain trace log;
determine, for each location slice, weights for the failure categories based on percentages of the failed call sessions in each failure category within the location slice;
determine cross-domain matrices for the frequency layer slices in the location slices by assigning coordinates to the failure categories in the cross-domain matrices based on average user device signal strengths and average user device interference levels retrieved from the failed call sessions comprised by the failure categories in the cross-domain trace log;
assign the weights for the failure categories to the corresponding coordinates in the cross-domain matrices; and
generate plots of the cross-domain matrices and analysis recommendations for display to a user based on the cross-domain matrices, wherein the analysis recommendations comprise sorted lists of failure categories requiring user investigation and a set of most likely root causes comprising a radio network error a core network error, and a device error.

2. The non-transitory, computer-readable storage medium of claim 1, wherein slicing the failed call sessions further causes the system to:
determine a total number of failed sessions for each location slice; and
determine a weight for a failure category based on a percentage of the total number of failed sessions for the failure category in a location slice, wherein a greater weight is based on a greater percentage of failed sessions in the location slice.

3. The non-transitory, computer-readable storage medium of claim 2:
wherein generating the plots of the cross-domain matrices further causes the system to arrange the sorted lists of failure categories according to the weights.

4. The non-transitory, computer-readable storage medium of claim 1, wherein determining the cross-domain matrices further causes the system to:
determine interference level thresholds based on a first user input or from an average interference level determined from historical cross-domain trace logs; and
determine signal strength thresholds based on a second user input or from an average signal strength determined from the historical cross-domain trace logs, wherein the interference level thresholds and the signal strength thresholds divide the cross-domain matrices into regions comprising:
  first quadrants comprising a first group of failed call sessions comprising good average signal strengths and good average interference levels;
  second quadrants comprising a second group of failed call sessions comprising bad average signal strengths and good average interference levels;
  third quadrants comprising a third group of failed call sessions comprising good average signal strengths and bad average interference levels; and
  fourth quadrants comprising a fourth group of failed call sessions comprising bad average signal strengths and bad average interference levels.

5. The non-transitory, computer-readable storage medium of claim 4, wherein determining the most likely root causes further causes the system to:
  determine quadrants for the failure categories on the cross-domain matrices based on a comparison of the coordinates of the failure categories to the interference level thresholds and to the signal strength thresholds; and
  based on the quadrants of the failure categories, assign to the failure categories the most likely root causes selected from the set of most likely root causes.

6. The non-transitory, computer-readable storage medium of claim 1:
  wherein the location slices are grouped according to RAN vendors or device OEM vendors.

7. The non-transitory, computer-readable storage medium of claim 6:
  wherein the plots comprise geographical displays of the location slices, wherein the device OEM vendors are grouped according to tracking area code (TAC), and
  wherein failed call sessions are organized geographically on the plots and represented according to TAC and failure category.

8. A system comprising:
  at least one hardware processor; and
  at least one non-transitory memory storing instructions, which, when executed by the at least one hardware processor, cause the system to:
  retrieve failed core sessions from a core network associated with a telecommunications network;
  retrieve failed radio sessions from a radio network associated with the telecommunications network;
  create a cross-domain trace log of failed sessions by matching failed radio sessions to failed core sessions using IDs and timestamps;
  slice the cross-domain trace log according to markets, frequency layers, and failure categories;
  determine weights for the failure categories within location slices based on percentages of the failed sessions;
  determine a cross-domain matrix for each frequency layer slice in each location slice and assign coordinates to weighted failure categories in the cross-domain matrix based on user device signal strengths and user device interference levels from the cross-domain trace log;
  determine priority scores for the failure categories based on the coordinates in the cross-domain matrix and the weights; and
  generate plots and analysis recommendations for display based on the priority scores, wherein the analysis recommendations comprise a sorted list of highest priority failures requiring user investigation and a set of most likely root causes comprising a radio network error, a core network error, and a device error.

9. The system of claim 8, wherein slicing the failed sessions further causes the system to:
  determine a total number of failed sessions in each location slice; and
  determine a weight for each failure category in each location slice based on a percentage of the total number of failed sessions each failure category accounts for, wherein a greater weight is based on a greater percentage of the failed sessions in a location slice.

10. The system of claim 9:
  wherein generating the plots of the cross-domain matrix further causes the system to arrange the sorted list of highest priority failures according to the weights.

11. The system of claim 8, wherein determining the cross-domain matrix further causes the system to:
  determine an interference level threshold based on a first user input or from an average interference level determined from historical cross-domain trace logs; and
  determine a signal strength threshold based on a second user input or from an average signal strength determined from the historical cross-domain trace logs,
  wherein the interference level threshold and the signal strength threshold divide the cross-domain matrix into regions comprising:
    a first quadrant comprising a first group of failed call sessions comprising good average signal strengths and good average interference levels;
    a second quadrant comprising a second group of failed call sessions comprising bad average signal strengths and good average interference levels;
    a third quadrant comprising a third group of failed call sessions comprising good average signal strengths and bad average interference levels; and
    a fourth quadrant comprising a fourth group of failed call sessions comprising bad average signal strengths and bad average interference levels.

12. The system of claim 11, wherein determining the most likely root cause further causes the system to:
  determine quadrants for the failure categories from the cross-domain matrix based on a comparison of the coordinates of the failure categories to the interference level threshold and to the signal strength threshold; and
  based on the quadrants of the failure categories, assign to the failure categories the most likely root cause selected from the set of most likely root causes.

13. The system of claim 8:
  wherein the location slices are grouped according to vendors, and
  wherein the vendors comprise device names.

14. The system of claim 13:
  wherein the plots comprise geographical displays of the markets,
  wherein the device names comprise TACs, and
  wherein failed call sessions are organized geographically on the plots and represented according to TACs and failure category.

15. A method comprising:
  retrieving core network trace logs from databases connected to a core network of a telecommunications network, the core network trace logs comprising core network data for failed call sessions that occurred in a first time interval;
  retrieving radio network trace logs from a radio network of the telecommunications network, the radio network trace logs comprising radio network data for the failed call sessions that occurred in the first time interval;

creating a cross-domain trace log of the failed call sessions by matching the radio network trace logs with the core network trace logs using corresponding subscriber IDs and failure timestamps;

slicing the failed call sessions into location slices, frequency layer slices, and failure categories using call termination cells, call termination frequency layers, and failure types from the cross-domain trace log;

determining, for each location slice, weights for the failure categories based on percentages of the failed call sessions in each failure category within the location slice;

determining cross-domain matrices for the frequency layer slices in the location slices by assigning coordinates to the failure categories in the cross-domain matrices based on average user device signal strengths and average user device interference levels retrieved from the failed call sessions comprised by the failure categories in the cross-domain trace log;

assigning the weights for the failure categories to the corresponding coordinates in the cross-domain matrices; and generating plots of the cross-domain matrices analysis recommendations for display to a user based on the cross-domain matrices, wherein the analysis recommendations comprise sorted lists of failure categories requiring user investigation and a set of most likely root causes comprising a radio network error, a core network error, and a device error.

16. The method of claim 15, wherein slicing the failed call sessions further comprises:

determining a total number of failed sessions for each location slice; and determining a weight for a failure category based on a percentage of the total number of failed sessions for the failure category in a location slice, wherein a greater weight is based on a greater percentage of failed sessions in the location slice.

17. The method of claim 16, wherein generating the plots of the cross-domain matrices further comprises:

arranging the sorted lists of failure categories according to the weights.

18. The method of claim 15, wherein determining the cross-domain matrices further comprises:

determining interference level thresholds based on a first user input or from an average interference level determined from historical cross-domain trace logs; and determining signal strength thresholds based on a second user input or from an average signal strength determined from the historical cross-domain trace logs, wherein the interference level thresholds and the signal strength thresholds divide the cross-domain matrices into regions comprising:

first quadrants comprising a first group of failed call sessions comprising good average signal strengths and good average interference levels;

second quadrants comprising a second group of failed call sessions comprising bad average signal strengths and good average interference levels;

third quadrants comprising a third group of failed call sessions comprising good average signal strengths and bad average interference levels; and fourth quadrants comprising a fourth group of failed call sessions comprising bad average signal strengths and bad average interference levels.

19. The method of claim 18, wherein determining the set of most likely root causes comprises:

determining quadrants for the failure categories on the cross-domain matrices based on a comparison of the coordinates of the failure categories to the interference level thresholds and to the signal strength thresholds; and based on the quadrants of the failure categories, assigning to the failure categories the set of most likely root causes selected from the set of most likely root causes.

20. The method of claim 15:

wherein the location slices are grouped according to RAN vendors or device OEM vendors.

* * * * *